United States Patent Office 2,754,489
Patented July 10, 1956

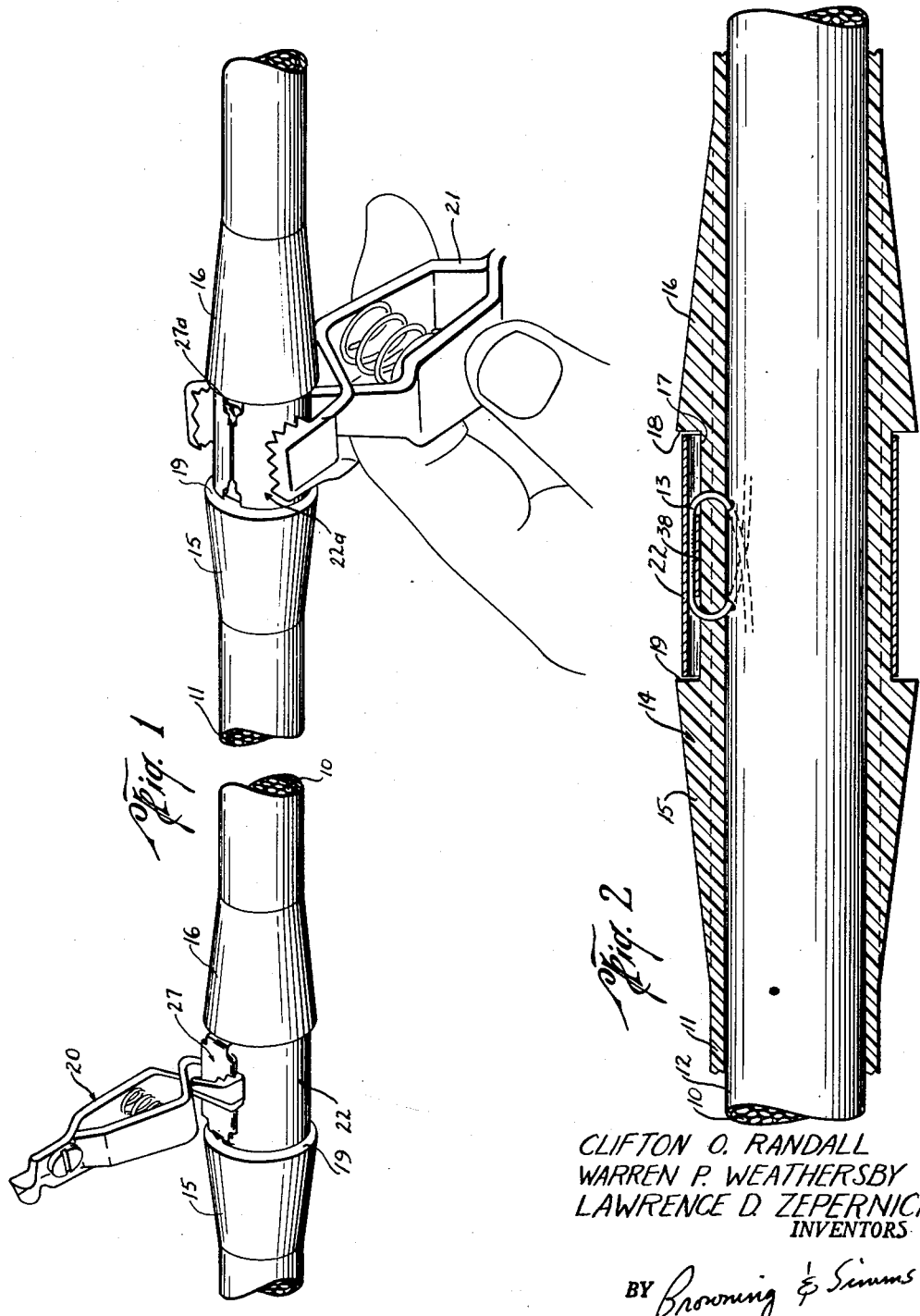

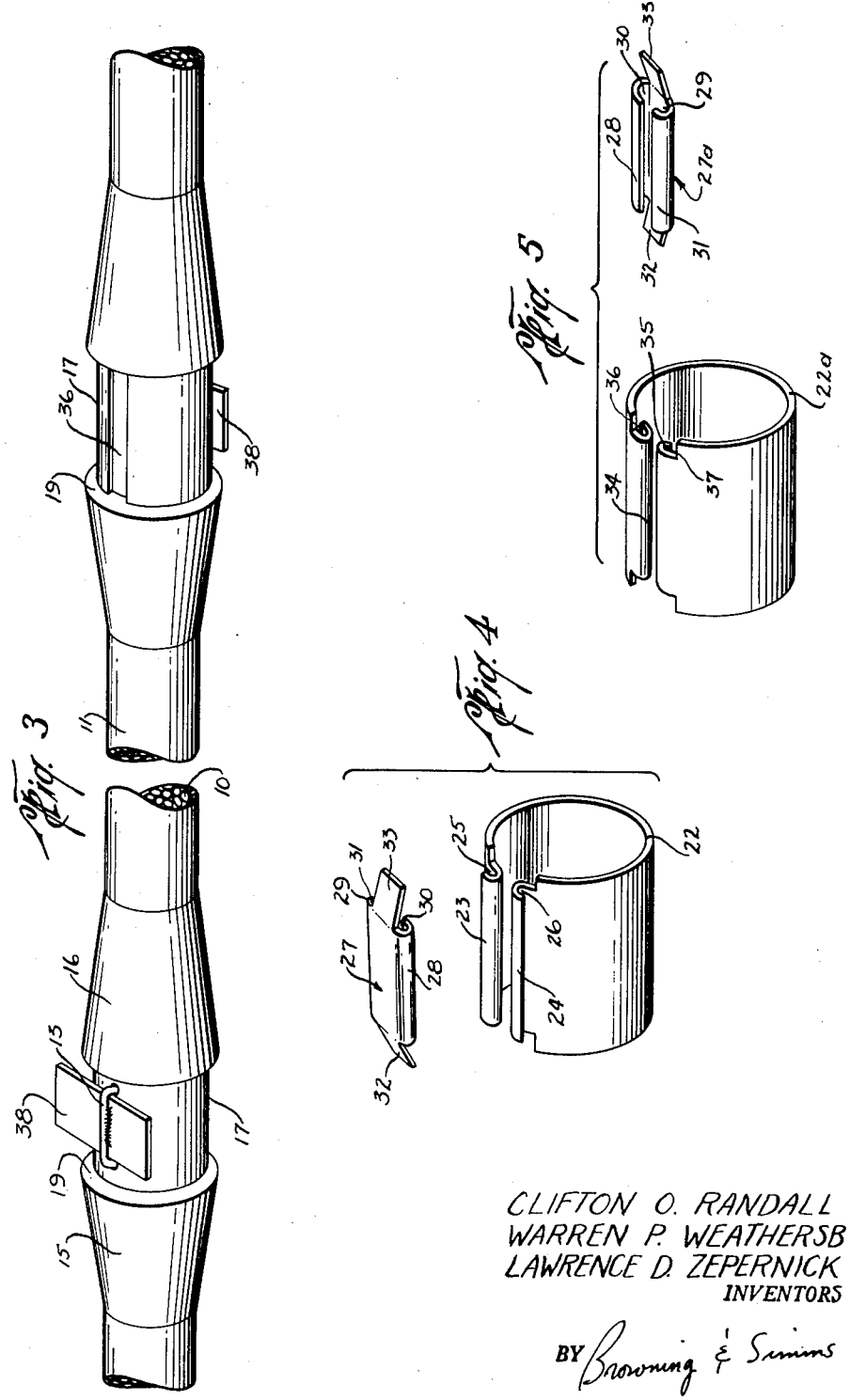

2,754,489
GEOPHONE-CABLE

Clifton O. Randall, Warren P. Weathersby, and Lawrence D. Zepernick, Houston, Tex., assignors to Vector Manufacturing Company, Houston, Tex., a partnership Application March 2, 1953, Serial No. 339,862

11 Claims. (Cl. 339—151)

This invention relates to an improved geophone cable for positively connecting one or more geophones to a recording apparatus in a manner that the geophone leads cannot be reverse-connected to the recording apparatus.

In modern seismic exploration practices, it is common to employ a plurality of geophones situated at predetermined points over the earth's surface and to record their output at a centrally located recording station. The connection between the recording mechanism at such station and the relatively short leads from the geophone is by a geophone cable strung out upon the ground from the central station to the vicinity of all of the geophones. Such cable often contains a large number of pairs of lead wires, one such pair being provided for each trace to be recorded upon the recording apparatus. Since large numbers of geophones are frequently hooked into a cable and quite frequently the geophones are spread over a considerable ground area remotely situated from the recording truck, it is apparent that the geophone cable will be dragged a considerable distance in stringing it out and reeling it in. Since the terrain over which the cable is strung can vary from swampy and marshy areas in tropical climates to frozen or rocky ground in cold climates to hot sandy deserts, it is apparent that the cable must be quite rugged to withstand the conditions under which it is used.

In connecting the individual geophones, or gangs of the same, to the geophone cable, it is necessary that the geophone or geophones be polarized with respect to the recording mechanism. For example, two lead wires in the geophone cable are provided for each trace to be made upon the recording mechanism and if the two leads from the geophone are reversed in their connection to such lead wires, the trace on the record will likewise be reversed and this greatly increases the difficulty of interpreting the record and, in some instances, the record would be so scrambled as to be unusable. Accordingly, it is necessary that all of the pairs of leads from the various geophones be connected to their respective pairs of lead wires in the geophone cable in a predetermined manner without reversing any such connections. Quite often, the personnel making the connections are unskilled so that it would be highly desirable to provide a cable which would make it impossible for the geophone leads to be reversed in connecting them to the geophone cable.

It is, therefore, an object of this invention to provide a geophone cable which is susceptible of satisfactorily withstanding not only normal use but also substantial abuse under field conditions involving various environments ranging from tropical swamps to frozen deserts.

Another object is to provide a geophone cable in which positively locked-in-place contact bands are provided in electrical contact with certain ones of lead wires within the cable, such bands being constructed so that geophone leads terminating in electrical clips can be connected to the bands only in a predetermined order and cannot be reversed so that the geophone is always positively polarized with respect to a recording apparatus.

Another object of this invention is to provide a geophone cable in which such bands are tightly and positively locked in place between protecting shoulders on the cable so that the bands cannot be displaced when winding in or stringing out the cable and so that water cannot freeze under the bands to cause their failure.

Another object of this invention is to provide a geophone cable having a lead wire formed with a loop extending through the cable sheath so as to be electrically connectible to a contact band, such loop providing sufficient slack in the lead wire that the cable can be bent or flexed in the vicinity of the band without breaking the electrical connection between the band and lead wire and without breaking the latter.

Another object of this invention is to provide a geophone cable having a protective sleeve providing a recessed portion in which a contact band is situated to protect the latter.

Another object of this invention is to provide a geophone cable wherein such sleeve is bonded to the cable sheath to form a reinforced watertight joint around a loop of lead wire emerging from the cable for electrical connection to a band whereby the cable is rendered fully waterproof.

Another object of this invention is to provide a geophone cable wherein an electrical connection between a lead and a contact band includes a flat spring connected to the wire with its ends depressed inwardly toward the cable by the band so that the resiliency of the spring maintains a portion of it in effective electrical contact with the band.

Other objects, advantages and features of this invention will be apparent to one skilled in the art upon the consideration of the written specification, the appended claims and the attached drawings wherein:

Fig. 1 is a perspective illustration of a geophone cable embodying this invention and illustrates the manner of attaching the electrical clips which are the termini of geophone leads to the cable in order to establish a circuit with a geophone;

Fig. 2 is a cross-sectional view through one of the sleeves in Fig. 1 and shows the mode of looping a lead wire of the cable and its electrical contact with the band;

Fig. 3 is a view similar to Fig. 1 but with the contact bands and their locking devices removed to illustrate the cable before the bands are placed in position;

Fig. 4 illustrates one type of contact band and locking device therefor; and

Fig. 5 illustrates another type of contact band and its locking device, the two to be used in conjunction with the band shown in Fig. 4.

Like characters of reference are used throughout the various views to designate like parts.

Referring to the drawings, it will be seen that the geophone cable comprises a plurality of lead wires 10 covered by a suitable sheath 11. Sheath 11 should be tough, flexible, and waterproof in nature and while various materials have such characteristics, polymerized vinyl chloride or vinyl acetate, or mixtures of the two, are found to be quite satisfactory. It is preferred where a plastic material is used, that the same be thermoplastic in nature although thermosetting materials have a degree of usefulness. In manufacturing the the cable, lead wires 10 are usually first formed into a cable-like bundle and then the latter is covered with a suitable covering 12, such as paper or the like, and then sheath 11 extruded therearound.

During the assembly of wires 10 into their bundle, the points at which take-outs or electrical contact bands are to be installed are selected and the wire to be connected to such band is formed with a loop 13. The loop can vary in size but preferably it is large enough so that upon flexing of the cable in the vicinity of the loop, there is sufficient slack in the loop to prevent the same from becoming sufficiently taut as to likely result in breaking the lead wire or pulling it out of electrical contact with the contact band. Since the loops formed during the cable manufacturing operation lie beneath the surface of sheath 11 and covering 12, a slit can be cut in the sheath and covering at the proper position and the loop pulled to expose a portion of its length externally of the cable. The subsequent bonding of a protective sleeve to the sheath, as described below, provides a watertight seal around the loop and seals the slit in sheath 11.

Protective sleeves are provided in spaced apart relation along the cable with each situated at a point where one of the loops 13 emerges from the cable sheath. Such protective sleeves are designated generally by the numeral 14 and comprise two conical portions 15 and 16 oppositely extending from each other and tapering to form a smooth juncture at their outer ends with sheath 11. A circumferentially recessed or reduced diameter portion 17 is provided immediate the ends of the sleeves thereby providing opposed shoulders 18 and 19 at each end of the reduced diameter portion.

The protective sleeves are preferably formed of the same material as sheath 11 and are molded around the sheath and bonded thereto. During such molding and bonding, it will be apparent that the material of the sleeve will likewise become bonded to loop 13 and will extend thereunder to close any slit in the sheath through which the loop was pulled during the manufacture of the cable. As a result, the protective sleeve provides a reinforced portion around the cable and effectively seals against any water seepage into the interior of sheath 11.

It will be understood that as thus far described in detail, the construction of both take-outs shown in Fig. 1 can be identical. As a matter of fact, the take-outs shown in the drawings vary only in that one of them employs a band and locking device shown in Fig. 4 and the other a band and locking device shown in Fig. 5 with a modification of one sleeve to facilitate installation of the latter.

In accordance with this invention, contact bands are provided around reduced diameter portions 17 of the sleeves between shoulders 18 and 19 and the construction of one of these bands is such that it presents a smooth substantially continuous outer surface free from projections to which an electrical clip of the jaw type, such as a spring clip, and of predetermined small size, can be attached. The other band, paired with the smooth band, provides such projection to which such small electrical clip can make a mechanical connection. With this construction, one of the leads from the geophone is provided with a clip 20 of sufficiently small size that its jaws cannot be spread sufficiently wide, even when fully opened, to pass completely around the smooth band but only sufficiently to make the desired mechanical connection with the projection from the other band. The other lead from the geophone is provided with a similar but larger clip 21 having jaws which can be spread sufficiently so that the clip can be passed entirely around the band as shown in Fig. 1. With this construction, it is impossible to connect clip 20 to any contact band other than one having a projection and once clip 20 is in position, as shown in Fig. 1, the only place that clip 21 can be connected is to the smooth band. As a result, the geophone will always be properly connected to the cable and its leads cannot be reversed which means that the geophone is always properly polarized with respect to a recording apparatus connected to the other end of the lead wires.

Referring to Fig. 4, the contact band with which clip 20 is to be connected comprises a strip 22 of electrically conductive metal. This strip is bent into a cylindrical configuration as shown in Fig. 4 and has portions 23 and 24 at its adjacent ends bent away from each other to provide channels 25 and 26 which are substantially parallel to each other but face in opposite directions. A locking device 27 for positively maintaining the metal strip 22 in place around the reduced diameter portion of the sleeve is shown as an elongate metal strip member having parallel edge portions 28 and 29 bent inwardly of the member to provide parallel channels 30 and 31 facing toward each other. With this construction, locking device 27 can be slid over strip 22 to mate its channels 30 and 31 with bent portions 23 and 24 of the strip. The locking device has tabs 32 and 33 situated at opposite ends of the member and these tabs can be bent downwardly, as illustrated in Fig. 4, after the locking device has been placed in position on strip 22 in order to prevent the locking device from being accidentally dislodged from the strip. The projection of the locking device from the outer surface of strip 22 provides a projection for connecting clip 20 to the contact band as shown in Fig. 1.

Referring to Fig. 5, the contact band for the larger clip 22 is illustrated and is quite similar to that in Fig. 4 except that it has bent portions 34 and 35 at the adjacent parallel edges of strip 22a which are extended inwardly of the strip to provide oppositely facing channels 36 and 37 on the inside of the strip. The locking device 27a for the band of Fig. 5 can be identical to that of Fig. 4. In its use, however, it is inserted on the interior of the strip so as to leave the outer surface of the strip free from projections. As is shown in Fig. 3, the reduced diameter portion which is to have the contact band of Fig. 5 attached thereto is provided with a groove 36 so that the locking device 27a of Fig. 5 can be slid along this groove in forming its connection with strip 22a. It will be noted that with the construction of Fig. 5, one of the end tabs can be bent upwardly before the locking device is inserted into the groove so that the bent up tab serves as a "sled runner" to facilitate insertion of such locking device. The tabs can be further bent up to lock the device in place.

From the foregoing it will be seen that each of the locking devices have a slidable interlocking connection with adjacently parallel edges of the metal strips so that the locking devices hold these ends of the bands together and are slidable longitudinally along the edges. By making strips 22 of suitable size, it will be possible to lock the bands very tightly in position around the reduced diameter portions of the sleeve and between the shoulders thereof. This ensures against accidental displacement of the bands. Further, since the strips are positively locked in position, any ice forming under the band and attempting to expand the same will simply exert its pressure against the sheath 11 to compress the cable somewhat and cannot cause the bands to spread and thereby form defective electrical connections.

Means are provided for electrically connecting loop 13 with its contact band. Such means can include a flat spring 38 placed under the loop 13 and soldered thereto. With spring 38 disposed with its length transverse of the longitudinal axis of the cable, the ends of the spring, upon locking the contact band around the cable, will be pressed inwardly toward the periphery of the protective sleeve and, due to the resiliency of the spring, these ends will always be urged outwardly thereby to maintain an effective electrical contact with the band.

It should be noted that the clearance between the contact band and the reduced diameter portion of the sleeve shown in the upper part of Fig. 2 has been somewhat exaggerated in order to more clearly show the arrangement of the parts. In actual construction, the clearance will be considerably less and spring 38 as well as loop 13 will be pressed somewhat into the surface of the sleeve.

It is believed that the use of the cable of this invention will be apparent from the foregoing. It will be understood that usually there will be a large number of the take-outs illustrated in Fig. 1 grouped in pairs along the length of the cable. With the cable constructed as described, it can be pulled from the truck and over practically any type of terrain without damage thereto. The conical portions 15 and 16 of the protective sleeve prevent the contact band from catching on rocks, bushes, and the like by causing the cable to ride up over the same and, further, by shielding the ends of the contact bands from catching on such structures. After the cable has been strung, it will be a simple matter to attach the geophones thereto simply by connecting the clips as shown in Fig. 1. If the operator can connect both clips to a pair of takeouts on the cable, he is assured that they are connected in the proper order. Should he find that he can only connect one clip to the cable, then he is attempting to improperly reverse the geophone leads and must make the thus indicated correction.

While spring member 38 has been described as having some resiliency, in a less preferred form member 38 can be made of a rather ductile material and the contact band pressed tightly therearound. The resiliency of the sleeve material itself will then be substantially the sole force urging member 38 outwardly into contact with the contact band.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A geophysical cable assembly for electrically connecting a geophone to a recording apparatus which comprises, in combination, a cable including a plurality of lead wires encased in a waterproof sheath, first and second protecting sleeves bonded to and spaced along said cable and each having an intermediate reduced diameter portion providing opposed shoulders at its ends, first and second contact bands respectively tightly encircling said reduced diameter portions and each including a strip of electrically conductive metal, locking devices securing adjacent ends of said strips together, the first band providing a substantially smooth and continuous surface free from projections to which an electrical clip can be mechanically attached, the locking device for the second band strip providing a projection from the outer surface of such strip adapted to have an electrical clip mechanically connected thereto whereby an electrical clip of predetermined small size can be connected to said second band but not to said first band, and means providing electrical contact between said bands and different ones of said lead wires.

2. The assembly of claim 1 wherein said strips have portions at their adjacent ends bent away from each other to form oppositely facing parallel channels and wherein said locking devices each comprise elongate members having parallel edge portions bent toward each other to provide parallel channels facing toward each other, the locking devices being slidable along the channels of said strips with the bent portions of the devices interlocked with the bent portions of the strips.

3. The assembly of claim 2 wherein said bent portions of said first band strip extend inwardly of the band strip toward the cable with the locking device therefor being disposed on the inside of the first band strip and wherein the bent portions of said second band strip extend outwardly thereof with the locking device therefore disposed on the outside of the second band strip.

4. The assembly of claim 3 in combination with electrical spring clips, one of said clips being of a size sufficiently large that its jaws can be opened to grasp said one band between them and the other clip being sufficiently small that there is insufficient space between its jaws when fully spread apart to grasp either of said bands between them but sufficient to permit said small clip to grasp said locking device of said other band whereby a geophone having leads terminating in said clips can be positively connected only to predetermined ones of said lead wires.

5. The assembly of claim 4 wherein tabs are provided at opposite ends of said locking devices to prevent said devices from sliding longitudinally from said band strips.

6. The assembly of claim 1 wherein said electrical contact means each comprises an elongate flat spring disposed with its length transverse of the longitudinal axis of the cable and between one of said bands and said cable, the lead wires to be electrically connected to said bands being looped to expose a portion thereof externally of said sleeves and such portion being electrically connected to said spring.

7. A geophysical cable assembly for operatively connecting a geophone to a recording apparatus which comprises, in combination, a cable including a plurality of lead wires encased in a waterproof sheath, first and second protecting sleeves each disposed around said sheath and bonded thereto, said sleeves being spaced apart from each other along said cable and each having opposed shoulders, one of said lead wires being looped to expose a portion thereof between said shoulders of said first sleeve and another lead wire looped to expose a portion thereof between the shoulders of the second sleeve, contact members connected to each of said first and second wires at said loops, and first and second contact bands situated between the respective shoulders of said first and second sleeves and pressing against said contact members, the said first band presenting a smooth outer surface and the second hand having a projecting portion to which an electrical clip can be readily attached whereby a clip of a predetermined small size can be connected to said second band but not to the first.

8. A geophysical cable assembly for operatively connecting a geophone to a recording apparatus which comprises, in combination, a cable including a plurality of lead wires, protective sleeves spaced along said cable and each having a circumferentially recessed portion, contact bands tightly encircling said sleeves within their recessed portions, each of said bands having adjacently parallel and longitudinally disposed edges, one of said bands having a locking device on the inside thereof and another with a locking device on the outside thereof, each of said locking devices and its band having a slidable interlocking connection therebetween so that said locking devices hold the ends of said bands together and are slidable longitudinally along said edges, said one band having a smoothly continuous outer surface free from projections to which an electrical clip of predetermined small size can be connected and the locking device of the other band providing such a projection to which such a clip can be mechanically connected, and means providing electrical contact between said bands and different ones of said lead wires.

9. The assembly of claim 8 wherein the lead wire electrically connected to one of said bands is looped outwardly of the cable to expose a portion of its length within said recessed portion of one of said sleeves whereby the cable can be bent at said one of said sleeves without substantially straining the electrical connection between said looped wire and its band.

10. The assembly of claim 9 wherein a flat spring is connected to said lead wire at its loop, said spring having its length extending transversely of the longitudinal axis of the cable and disposed between the band and the sleeve associated therewith.

11. The assembly of claim 8 in combination with electrical spring clips, one of the clips being of a size sufficiently large that its jaws can be opened to grasp said one band between them and the other clip being sufficiently small that there is insufficient space between its jaws when fully spread apart to grasp either of said bands between them but sufficient to permit said small clip to grasp said locking device of said other band whereby a geophone having leads terminating in said clips can be positively connected to only predetermined ones of said lead wires.

References Cited in the file of this patent

UNITED STATES PATENTS

| | | |
|---|---|---|
| 2,164,381 | Bradley | July 4, 1939 |
| 2,253,830 | Winterhalter | Aug. 26, 1941 |
| 2,269,135 | Tate | Jan. 6, 1942 |
| 2,581,994 | Winterhalter | Jan. 8, 1952 |
| 2,654,077 | McLoad | Sept. 29, 1953 |